United States Patent [19]

Sybert

[11] Patent Number: 4,746,708
[45] Date of Patent: May 24, 1988

[54] HYDROXYALKYL- AND AMINOALKYL-FUNCTIONALIZED POLYPHENYLENE ETHERS

[75] Inventor: Paul D. Sybert, Pittsfield, Mass.

[73] Assignee: General Electric Company, Schenectady, N.Y.

[21] Appl. No.: 901,858

[22] Filed: Aug. 29, 1986

Related U.S. Application Data

[63] Continuation-in-part of Ser. No. 866,661, May 27, 1986.

[51] Int. Cl.$^4$ ............................................. C08G 65/48
[52] U.S. Cl. .................... 525/392; 525/390; 525/391; 525/397; 525/534; 528/170; 528/176; 528/184; 528/192; 528/206; 528/208
[58] Field of Search ............... 525/390, 391, 397, 534, 525/395, 396, 392; 528/192, 170, 184, 176, 205, 206, 208

[56] References Cited

U.S. PATENT DOCUMENTS 4,315,086 2/1982 Ueno .................................. 525/391
4,681,915 7/1987 Bates et al. ........................ 525/148

*Primary Examiner*—Patricia Short
*Attorney, Agent, or Firm*—William H. Pittman; James C. Davis, Jr.; James Magee, Jr.

[57] ABSTRACT

Hydroxyalkyl- and aminoalkyl-functionalized polyphenylene ethers are prepared by the reaction of polyphenylene ethers with bis-hydroxyalkyl maleates or fumarates, or with the corresponding acids or anhydrides, terephthaloyl chloride or the like followed by esterification or imidization with diols, diamines or amino alcohols. They are useful in the preparation of polyphenylene ether copolymers, which in turn are useful for the compatibilization of blends of polyphenylene ethers with linear polyesters.

18 Claims, No Drawings

HYDROXYALKYL- AND AMINOALKYL-FUNCTIONALIZED POLYPHENYLENE ETHERS

This application is a continuation-in-part of copending application Ser. No. 866,661, filed May 27, 1986.

This invention relates to functionalized polyphenylene ethers and their preparation and use.

The polyphenylene ethers are a widely used class of thermoplastic engineering resins characterized by excellent hydrolytic stability, dimensional stability and dielectric properties. They are also resistant to high temperature conditions under many circumstances. Because of the brittleness of many compositions containing polyphenylene ethers, they are frequently blended with impact modifiers such as elastomers to form molding compositions.

A disadvantage of the polyphenylene ethers which militates against their use for molding such items as automotive parts is their low resistance to non-polar solvents such as gasoline. For increased solvent resistance, it would be desirable to blend the polyphenylene ethers with resins which have a high degree of crystallinity and therefore are highly resistant to solvents. Illustrative of such resins are linear polyesters, including poly(alkylene dicarboxylates). However, such blends frequently undergo phase separation and delamination. They typically contain large, incompletely dispersed polyphenylene ether particles and no phase interaction between the two resin phases. Molded parts made from such blends are typically characterized by extremely low impact strength.

The present invention includes functionalized polyphenylene ethers which are capable of compatibilizing blends of polyphenylene ethers with such polymers as linear polyesters. In its broadest aspect, it is directed to functionalized polyphenylene ethers containing at least one moiety having the formula

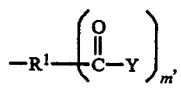

wherein $R^1$ is a polyvalent bridging radical containing at least one hydrocarbon group, each Y is $OR^2$—XH or two adjacent Y's taken together are $NR^2$—XH, $R^2$ is a lower alkylene, cycloalkylene or arylene radical, X is O or NH and m is from 1 to about 10.

The polyphenylene ethers (also known as polyphenylene oxides) used in this invention are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

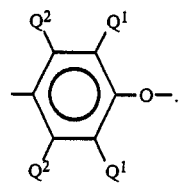

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–60,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds and ω-hydroxyoximes.

Among the polyphenylene ethers which are useful for the purpose of this invention are those which comprise molecules having at least one of the end groups of the formulas

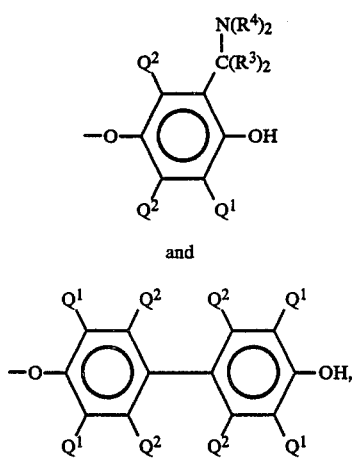

and

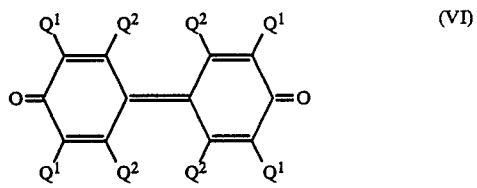

wherein $Q^1$ and $Q^2$ are as previously defined; each $R^3$ is independently hydrogen or alkyl, with the proviso that the total number of carbon atoms in both $R^3$ radicals is 6 or less; and each $R^4$ is independently hydrogen or a $C_{1-6}$ primary alkyl radical. Preferably, each $R^3$ is hydrogen and each $R^4$ is alkyl, especially methyl or n-butyl.

Polymers containing the aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

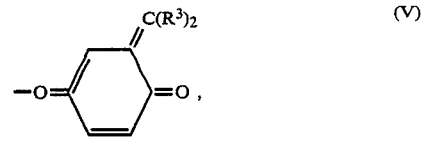

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula IV are typically obtained from reaction mixtures in which a by-product diphenoquinone of the formula is present, especially in a copper-halide-secondary or tertiary amine system. In this regard, the disclosures of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas III and IV. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

The polyphenylene ether is linked to the structure shown in formula I. The $R^1$ values in that formula may be polyvalent (i.e., divalent or greater) aliphatic, alicyclic or aromatic hydrocarbon radicals, substituted hydrocarbon radicals or radicals containing at least one non-carbon linking atom, provided they contain at least one hydrocarbon group. Illustrative linking atoms are oxygen and sulfur, with oxygen being preferred. Illustrative substituents are hydroxy, halo, nitro, alkoxy, carboxy, carbalkoxy and carbaryloxy. Their formula weight is usually relatively low, typically up to about 150.

The Y values may each be lower hydroxyalkylene or lower aminoalkylene. Alternatively, two adjacent Y values taken together may form with the remainder of the molecule an imide moiety containing a lower hydroxyalkylene or lower aminoalkylene N-substituent.

The R² values are lower alkylene (i.e., alkylene of up to 7 carbon atoms), cycloalkylene or arylene radicals. They are most often $C_{2-6}$ alkylene and particularly straight chain alkylene.

The value of m may be from 1 to about 10. Values higher than 2 are possible by reason of the possibility of grafting involving more than one maleate or maleimide moiety (by the method described hereinafter) at a single site on the polyphenylene ether molecule. Moreover, an average of about 1–5 moieties of formula I are generally present per polyphenylene ether molecule.

Certain functionalized polyphenylene ethers of this invention may be prepared by reacting a polyphenylene ether with a compound of the formula

wherein Y is OH-terminated and is otherwise as previously defined. Illustrative compounds of this type are the bis-hydroxyalkyl maleates and fumarates and the N-hydroxyalkylmaleimides.

The reaction is typically effected by merely blending the two reagents under conditions adapted for the formation of an intimate blend, and at temperatures high enough to prepare a melt. Typical temperatures are within the range of about 230°–390° C. It is preferred that mixing be in the absence of free radical initiators.

Certain functionalized polyphenylene ethers of this invention may also be prepared by reacting maleic acid, fumaric acid or maleic anhydride with a polyphenylene ether under the above-described conditions, and subsequently forming an ester or imide by reaction of the resulting composition with an appropriate diol, aminoalkanol or diamine. The conditions of the latter reaction are conventional and will be readily apparent to those skilled in the art. It should be noted that compositions derived from unsaturated acids such as maleic or fumaric acid and wherein Y is amino-terminated should be prepared in this manner to avoid a Michael-type self-addition of the amine groups to the olefinic bonds.

The proportions of polyphenylene ether and functionalizing compound are not critical, provided the functionalizing compound is used in minor proportions compared to the polyphenylene ether. Most often, about 0.1–10 parts and preferably about 1.0–5 parts of functionalizing agent are present per 100 parts of polyphenylene ether.

Suitable mixing conditions often include extrusion, which may be conveniently effected in a screw-type or similar extruder which supplies a substantial shearing force to the composition. In certain instances, it may be advantageous to vacuum vent the extruder by connecting the vent thereof to a vacuum pump capable of drawing a vacuum of about 20 torr or less. It is also sometimes found advantageous to extrude the mixture more than once, thereby ensuring effective blending.

The precise chemical nature of the functionalization which takes place upon practice of the above-described method is not known with certainty. The principal reaction may be a thermally initiated free radical interaction of the carbon-carbon double bond with the aromatic rings or the substituents thereon, especially the latter, to produce a product which may include single moieties and/or grafted side chains derived from the functionalizing agent.

It is known, however, that the functionalization is in the form of moieties having the formula

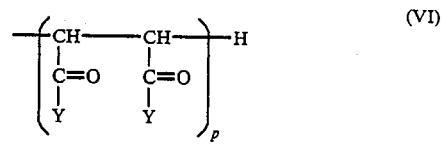

wherein Y is as previously defined and p is from 1 to about 5. In any event, this aspect of the invention is in no way dependent on reaction mechanism or theory.

Still other compositions of this invention may be prepared by esterification or imidization of various acid-functionalized polyphenylene ethers such as those disclosed in U.S. Pat. No. 4,600,741 and in copending, commonly owned application Ser. No. 780,151, filed Sept. 26, 1985, the disclosures of which are also incorporated by reference herein. The compositions in this class are prepared by reaction of the polyphenylene ether with a compound of the formula

wherein R⁵ is an aromatic or saturated aliphatic radical, X¹ is halogen (especially chlorine) and X² is one or two carboxylic acid, acid halide, acid salt, acid amide or acid ester groups or a dicarboxylic acid anhydride or imide group. Illustrative compounds of this type are terephthaloyl chloride, carboxymethylsuccinic anhydride acid chloride and trimellitic anhydride acid chloride (TAAC).

The compositions prepared by this method contain moieties of the formula

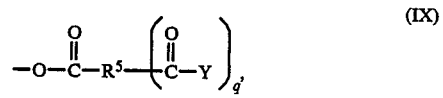

wherein R⁵ is as previously defined and q is 1 or 2.

The preparation of the functionalized polyphenylene ethers of this invention is illustrated by the following examples.

EXAMPLES 1–2

Examples 1–3 describe the preparation of bis(hydroxyalkyl) maleates and fumarates used in the preparation of hydroxyalkyl-functionalized polyphenylene ethers of the invention.

Titanium(IV) isopropoxide was added at 165° C. to a mixture of dimethyl maleate and 1,4-butanediol. Heating at this temperature was continued to complete esterification, with removal of by-product methanol by distillation. When methanol removal was complete, any excess diol was removed by vacuum stripping to yield the desired bis(hydroxyalkyl) maleates. The details of their preparation are given in Table I.

TABLE I

| Example | Dimethyl maleate, moles | Diol amt., moles | Ti(OC₃H₇)₄, ml. |
|---------|-------------------------|------------------|-----------------|
| 1 | 0.368 | 2.18 | 0.2 |
| 2 | 1.96 | 3.55 | 0.15 |

EXAMPLE 3

A solution of 0.1 mole of fumaryl chloride in 40 ml. of methylene chloride was added dropwise at 5°–10° C. over 2 hours under nitrogen, with stirring, to a suspension of 0.8 mole of 1,6-hexanediol in 1 liter of methylene chloride. There was simultaneously added a solution of 0.21 mole of sodium hydroxide in 50 ml. of water. The mixture was stirred and allowed to warm to room temperature and the organic layer was separated, filtered through magnesium sulfate and vacuum stripped. Unreacted 1,6-hexanediol was removed by vacuum distillation. The residue was the desired bis(6-hydroxyhexyl) fumarate.

EXAMPLES 4–11

Polyphenylene ethers were dry blended with the bis(hydroxyalkyl) maleates of Examples 1-3 and the blends were extruded in a twin-screw extruder, with vacuum venting. The extrudates, constituting the desired hydroxyalkyl-functionalized polyphenylene ethers, were quenched in water and pelletized. The details of functionalized are given in Table II.

TABLE II

| Example | Polyphenylene ether IV, dl./g. | Maleate of Example | Parts maleate per 100 parts polyphenylene ether | Extruder temp., °C. |
|---|---|---|---|---|
| 4 | 0.5 | 1 | 1 | 275 |
| 5 | 0.5 | 1 | 2 | 275 |
| 6 | 0.5 | 1 | 5 | 275 |
| 7 | 0.4 | 2 | 2 | 285 |
| 8 | 0.5 | 2 | 2 | 290 |
| 9 | 0.5 | 3 | 2.5 | 293 |
| 10 | 0.5 | 3 | 1 | 293 |
| 11 | 0.5 | 3 | 5 | 293 |

EXAMPLE 12

A blend of 100 parts (by weight) of polyphenylene ether and 0.5 part of maleic anhydride was prepared in a Henschel mixer and extruded at 330° C. (extruder wall temperature) on a twin screw extruder. The extrudate, comprising an anhydride-functionalized polyphenylene ether, was quenched in a water bath and pelletized.

Ethanolamine, 0.2 ml., was added to a solution of 19.41 grams of the anhydride-functionalized polyphenylene ether in 100 ml. of o-dichlorobenzene. The solution was heated at 170° under nitrogen overnight, with stirring. The N-hydroxyalkylimide-functionalized polyphenylene ether was precipitated with methanol, reprecipitated three times from chloroform with methanol and dried under vacuum.

EXAMPLE 13

Ethylenediamine, 3 ml., was added to a solution of 10 grams of the anhydride-functionalized polyphenylene ether of Example 12 in 100 ml. of toluene, while said solution was maintained at reflux under nitrogen. Refluxing was continued for 6 hours, after which the N-aminoalkylimide-functionalized polyphenylene ether was precipitated by addition of methanol, reprecipitated from chloroform with methanol, and dried at 60° in vacuum.

EXAMPLES 14–18

Hydroxyalkyl-functionalized polyphenylene ethers were prepared by the reaction of various poly(2,6-dimethyl-1,4-phenylene)ethers with terephthaloyl chloride and 1,4-butanediol or 1,6-hexanediol, according to the following procedure.

A solution of the polyphenylene ether in toluene was distilled to remove about 75 ml. of toluene and any water or other volatiles. The solution was cooled to 70° C. and terephthaloyl chloride was added, after which the solution was stirred at the same temperature for 2 hours. Triethylamine was added and the mixture was stirred overnight. A solution of the diol in 150 ml. of chloroform was then added and stirring was continued at 70° C. for 4 hours. The hydroxyalkyl-functionalized polyphenylene ether was precipitated with methanol, dissolved in chloroform, reprecipitated with methanol and dried under vacuum at 60° C.

The compositional details and other parameters are given in Table III.

TABLE III

| Example | Polyphenylene ether IV, dl./g. | Polyphenylene ether Amt., g. | Toluene, l. | Terephthaloyl chloride, g. | Triethylamine, g. | Diol No. of carbons | Diol Amt., g. | Product IV | Product % OH by wt. |
|---|---|---|---|---|---|---|---|---|---|
| 14 | 0.51 | 325 | 3.0 | 16.9 | 18.6 | 4 | 40 | 0.54 | 0.053 |
| 15 | 0.51 | 456 | 3.75 | 23.8 | 25.0 | 4 | 58 | — | |
| 16 | 0.51 | 456 | 3.75 | 32.8 | 34.2 | 4 | 78 | 0.48 | 0.039 |
| 17 | 0.43 | 440 | 3.75 | 31.6 | 31.5 | 6 | 99 | | 0.038 |
| 18 | 0.43 | 469 | 3.75 | 24.4 | 25.4 | 6 | 75 | 0.50 | 0.035 |

As previously indicated, the functionalized polyphenylene ethers of this invention are useful in the preparation of compatibilized blends of polyphenylene ethers with linear polyesters. In particular, said functionalized polyphenylene ethers form copolymers with polyesters, which may be used for compatibilization of such blends. Compositions comprising polyphenylene ether-polyester copolymers are disclosed and claimed in the aforementioned application Ser. No. 866,661, filed May 27, 1986.

Among the linear polyesters which are useful in preparing copolymers with the functionalized polyphenylene ethers are the poly(alkylene dicarboxylates). They typically comprise at least 30 and most often at least 50 structural units, usually of the formula

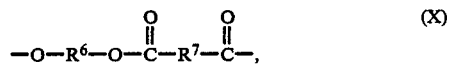

$$-O-R^6-O-\overset{O}{\underset{\|}{C}}-R^7-\overset{O}{\underset{\|}{C}}-, \quad (X)$$

wherein $R^6$ is a divalent aliphatic or alicyclic radical containing about 2–10 carbon atoms and $R^7$ is a divalent aliphatic, alicyclic or aromatic radical containing about 2–10 and usually about 6–10 carbon atoms.

Such polyesters are typically prepared by the known reaction of dihydroxy compounds with dicarboxylic acids or functional derivatives thereof such as anhydrides, acid chlorides or lower alkyl (especially methyl) esters, preferably the esters.

The $R^6$ radicals may be one or more aliphatic or alicyclic hydrocarbon radicals, alicyclic radicals being known to those skilled in the art to be equivalent to aliphatic radicals for the purposes of the invention. They may be derived from such dihydroxy compounds as ethylene glycol, 1,4-butanediol (both of which are preferred), propylene glycol, 1,3-propanediol, 1,6-hexanediol, 1,10-decanediol, 1,4-cyclohexanedimethanol and 2-butene-1,4-diol. They may also be radicals containing substituents which do not substantially alter the reactivity of the dihydroxy compound (e.g., alkoxy, halo, nitrile) or hetero atoms (e.g., oxygen or sulfur). The $R^6$ radicals are usually saturated.

The $R^7$ radicals may be derived from such acids as succinic, adipic, maleic, isophthalic and terephthalic acids or similar substituted and hetero atom-containing acids.

Most often, $R^6$ and $R^7$ are hydrocarbon radicals, typically containing about 2–10 carbon atoms. Preferably, $R^6$ is aliphatic and $R^7$ is aromatic. The polyester is most desirable a poly(alkylene terephthalate), particularly poly(ethylene terephthalate) or poly(1,4-butylene terephthalate) (hereinafter sometimes simply "polyethylene terephthalate" and "polybutylene terephthalate", respectively) and especially the latter. Such polyesters are known in the art as illustrated by the following patents: U.S. Pat. Nos. 2,465,319, 2,720,502, 2,727,881, 2,822,348, 3,047,539, 3,671,487, 3,953,394, 4,128,526. The polyesters most often have number average molecular weights in the range of about 10,000–70,000, as determined by intrinsic viscosity (IV) at 30° C. in a mixture of 60% (by weight) phenol and 40% 1,1,2,2-tetrachloroethane.

It is also contemplated to employ elastomeric polyesters. Such polyesters are known in the art; they are exemplified by compositions in which a portion of the $R^6$ values are soft segment radicals such as polyoxyalkylene (typically polyoxyethylene or polyoxytetramethylene) and units derived from lactones such as ε-caprolactone. Numerous elastomeric polyesters of this type are commercially available; they include those sold by DuPont under the trademark HYTREL and by General Electric under the trademark LOMOD.

To prepare the copolymer compositions, the functionalized polyphenylene ether and polyester are heated together in solution or in the melt. The reaction temperature is typically within the range of about 150°–290° C. The proportions of functionalized polyphenylene ether and polyester are not critical and may be adjusted over a wide range to yield copolymer compositions having the desired properties.

In general, the copolymer compositions comprise only partially copolymer, with the balance being a polyphenylene ether-polyester blend. The approximate proportion of copolymer in the composition may often be conveniently expressed as the percentage of copolymerized polyphenylene ether based on total polyester. It may be determined by extracting unreacted polyphenylene ether with a suitable solvent, typically toluene or chloroform, and analyzing the insoluble residue (copolymer and residual polyester) by proton nuclear magnetic resonance.

It is frequently preferred to maximize the proportion of carboxy end groups in the polyester. This may frequently be accomplished by preextruding the polyester, typically at a temperature in the range of about 250°–300° C. Under these conditions, there is apparently a loss by degradation and volatilization of hydroxy end group functionality, producing a polymer with a high proportion of carboxy end groups.

The preparation of polyphenylene ether-polyester copolymer compositions is illustrated by the following examples.

EXAMPLES 19–26

Solutions in 200 ml. of 1,2,4-trichlorobenzene of 10 grams of functionalized polyphenylene ether and 10 grams of a poly(butylene terephthalate) having a weight average molecular weight of about 50,000 and a carboxy end group concentration of 24.7 microequivalents per gram were heated to 220° C. and 0.1 ml. of titanium(IV) isopropoxide was added. Heating was continued under nitrogen, with stirring, with samples being periodically removed and analyzed for copolymer formation. The results are given in Table IV.

TABLE IV

| Example | Functionalized PPE of Example | % copolymerized PPE |
|---------|-------------------------------|---------------------|
| 19 | 4 | 15 |
| 20 | 5 | 31 |
| 21 | 6 | 36 |
| 22 | 7 | 21 |
| 23 | 8 | 21 |
| 24 | 9 | 30 |
| 25 | 10 | 14 |
| 26 | 11 | 46 |

EXAMPLE 27

A solution of 20 grams of the hydroxyalkyl-functionalized polyphenylene ether of Example 14, 32.2 grams of dimethyl terephthalate, 16.4 grams of 1,4-butanediol and 0.18 ml. of tetraisopropyl titanate in 40 ml. of 1,2,4-trichlorobenzene was heated at 170° C., with stirring, as methanol was removed by distillation. When 10 grams of methanol had been removed, the temperature was increased to 255° C. and vacuum was applied to remove trichlorobenzene and excess diol. The resulting melt was stirred at 255° C. for 1½ hours at 0.1 torr to produce the desired polyphenylene ether-polybutylene terephthalate copolymer.

EXAMPLE 28

A mixture of 79 grams of dimethyl terephthalate, 63 grams of 1,4-butanediol and 0.1 ml. of tetra-2-ethylhexyl titanate was heated at 165°–235° C. as methanol was removed by distillation, and then under vacuum for ½ hour at 250°–265° C. There was then added, under nitrogen, 60 grams of the hydroxyalkyl-functionalized polyphenylene ether of Example 17. The mixture was stirred at 250°–265° C. under nitrogen for 5 minutes and under reduced pressure for 30 minutes. Upon analysis, it was shown that about 7% of the polyphenylene ether was copolymerized.

As previously mentioned, the above-described copolymer compositions, and polyphenylene ether-poly(alkylene dicarboxylate) blends in which they are incorporated, have high impact strength, good solvent resistance and other advantageous properties. These properties make them useful for the preparation of molded and extruded articles.

The weight ratio of polyester to total polyphenylene ether in the copolymer-containing blend is generally in the range of about 0.5–3.0:1, most often about 0.9–2.5:1. The proportion of copolymerized polyphenylene ether therein is capable of wide variation, essentially any quantity thereof affording some improvement in properties. For the most part, said proportion is in the range of about 10–80% by weight of total resinous components.

The blends may also contain ingredients other than the copolymer, polyphenylene ether and polyester. A particularly useful other ingredient in many instances is at least one elastomeric impact modifier which is compatible with the polyphenylene ether. It is generally present in the amount of about 5–25% by weight of resinous components.

Suitable impact modifiers include various elastomeric copolymers, of which examples are ethylene-propylenediene polymers (EPDM's), both unfunctionalized and functionalized with (for example) sulfonate or phosphonate groups; carboxylated ethylene-propylene rubbers; copolymers (usually block or graft) of alkenylaromatic compounds such as styrene and/or epoxy compounds such as glycidyl methacrylate with polymerizable olefins or dienes, including butadiene, isoprene, chloroprene, ethylene, propylene and butylene; and core-shell elastomers containing, for example, a poly(alkyl acrylate) core attached to a polystyrene shell via an interpenetrating network. Such core-shell elastomers are more fully disclosed in copending, commonly owned application Ser. No. 811,808, filed Dec. 20, 1985, now U.S. Pat. No. 4,681,915.

The preferred impact modifiers are block (typically diblock, triblock or radial teleblock) copolymers of alkenylaromatic compounds and dienes. Most often, at least one block is derived from styrene and at least one other block from at least one of butadiene and isoprene. Especially preferred are the triblock copolymers with polystyrene end blocks and diene-derived midblocks. It is frequently advantageous to remove (preferably) or reduce the aliphatic unsaturation therein by selective hydrogenation. The weight average molecular weights of the impact modifiers are typically in the range of about 50,000–300,000. Block copolymers of this type are commercially available from Shell Chemical Company under the trademark KRATON, and include KRATON D1101, G1650, G1651, G1652, G1657 and G1702.

Other conventional ingredients which may be present in the copolymer-containing blends include fillers, flame retardants, colorants, stabilizers, antistatic agents, mold release agents and the like, used in conventional amounts. The presence of other resinous components is also contemplated. These include impact modifiers compatible with the polyester, such as various graft and core-shell copolymers of such monomers as butadiene, styrene, butyl acrylate and methyl methacrylate. The presence of such copolymers frequently improves the low-temperature ductility of the blends.

The preparation of copolymer-containing blends is normally achieved under conditions adapted for the formation of an intimate resin blend. Such conditions often include extrusion, typically at temperatures in the range of about 100°–300° C. and otherwise under the conditions previously described. Extrusion may be conveniently effected in a screw-type or similar extruder which applies a substantial shearing force to the composition, thereby decreasing the particle size thereof. It is sometimes found that the impact strength of the composition is increased if it is extruded more than once, thereby insuring effective blending.

What is claimed is:

1. A functionalized polyphenylene ether containing at least one moiety having the formula

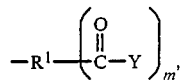

wherein $R^1$ is a polyvalent bridging radical containing at least one hydrocarbon group; each Y is $OR^2$—XH or two adjacent Y's taken together are $NR^2$—XH, $R^2$ is a lower alkylene, cycloalkylene or arylene radical, X is O or NH and m is from 1 to about 10.

2. A composition according to claim 1 which is derived from a polyphenylene ether comprising a plurality of structural units having the formula

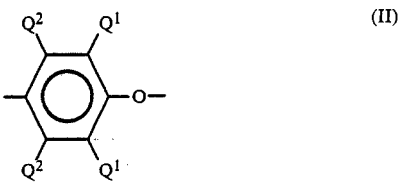

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. A composition according to claim 2 wherein an average of about 1–5 moieties of formula I are present per polyphenylene ether molecule.

4. A composition according to claim 3 wherein $R^1$ is $C_{2-6}$ straight chain alkylene.

5. A composition according to claim 3 wherein said moiety has the formula

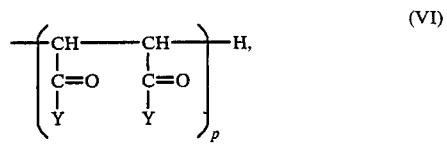

wherein p is from 1 to about 5.

6. A composition according to claim 5 wherein the polyphenylene ether is a poly(2,6-dimethyl-1,4-phenylene ether).

7. A composition according to claim 6 wherein each Y is $OR^2$—XH.

8. A composition according to claim 7 wherein X is O.

9. A composition according to claim 7 wherein X is NH.

10. A composition according to claim 6 wherein both Y's taken together are $NR^2$—XH.

11. A composition according to claim 10 wherein X is O.

12. A composition according to claim 10 wherein X is NH.

13. A composition according to claim 3 wherein said moiety has the formula

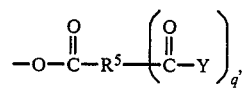 (IX)

wherein R⁵ is an aromatic or saturated aliphatic radical and q is 1 or 2.

14. A composition according to claim 13 wherein R⁵ is p-phenylene and q is 1.

15. A composition according to claim 14 wherein the polyphenylene ether is a poly(2,6-dimethyl-1,4-phenylene ether).

16. A composition according to claim 15 wherein Y is OR²—XH.

17. A composition according to claim 16 wherein X is O.

18. A composition according to claim 16 wherein X is NH.

* * * * *